Patented Dec. 1, 1942

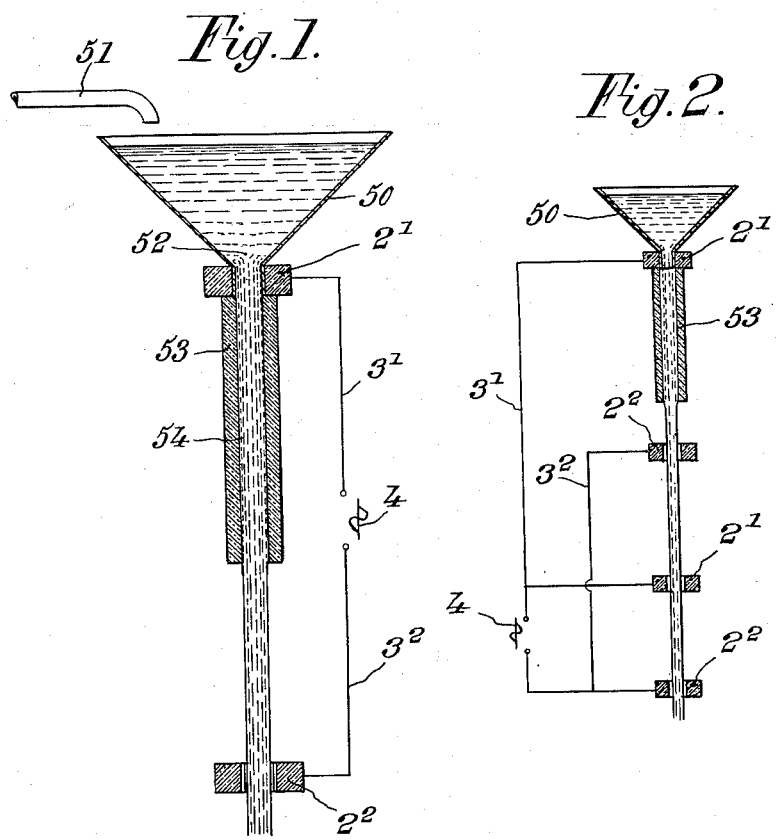

2,303,341

UNITED STATES PATENT OFFICE 2,303,341

METHOD AND APPARATUS FOR HEATING AND VULCANIZING RUBBER AND SIMILAR MATTER

René Dufour, Paris, Seine, and Henri Auguste Leduc, Asnieres, Seine, France

Application November 26, 1937, Serial No. 176,740
In Luxemburg December 4, 1935

8 Claims. (Cl. 18—8)

The present invention relates to methods and apparatus of heating and vulcanizing rubber and similar matter, said method being of the kind of that specified and claimed in our pending application S. N. 44,974 and which comprises placing the mass to be treated between metallic elements adapted to form the electrodes of an electric condenser and supplying to said elements alternating current, advantageously of relatively high frequency.

One object of the invention consists in a method for producing threads or bands of material from liquid rubber or fluid latex which comprises continuously passing a thread or band-like mass of said fluid between the electrodes of a condenser, applying an alternating current, advantageously of relatively high frequency, to said electrodes and coagulating said mass by heat generated therein under the electrical action of said condenser.

The liquid mass to be treated may pass, in the form of a thread or band, through aligned openings located in metallic elements adapted to constitute said electrodes or in form of a band between said electrodes.

In the accompanying drawing:

Figs. 1 and 2 show, both in vertical diagrammatic section, two arrangements constructed respectively and according to two variations of a first embodiment of the invention.

As initial materials there are taken fluid latex, liquid rubber, gums or the like in a fluid or non-coagulated state and which can, if necessary, be made sensitive to heat treatment by adding thereto an appropriate sensitiser or coagulation accelerator.

For the arrangement according to Figs. 1 and 2, this initial material is delivered, in the form of a thread, by suitable means such as drawplates or other devices already utilised in the industry engaged on the manufacture of threads of flexible material starting from a more or less fluid mass.

For the example shown in Fig. 1, recourse is had to a hopper 50 of glass or other similar material and this hopper is fed continuously by a conduit 51 in such a way that the level remains practically constant. The orifice 52 of the base of the said hopper is given a form and dimensions which agree with those of the transverse section of the coagulated thread it is desired to obtain.

At the outlet end of the hopper there is provided, concentrically to the orifice 52, a ring or metallic annular member $2^1$, of which the internal opening corresponds substantially to that of the outlet orifice of the hopper. Below the ring $2^1$ there is disposed, coaxially, a tube or sleeve 53 of a non-conducting material, such as quartz, to which is given a length such that the material, after having undergone the heat treatment explained hereafter, leaves the said tube sufficiently or completely coagulated.

Beyond the outlet end of the said tube 53 coaxially, there is provided a second ring or annular member $2^2$ of dimensions equal or not to those of the ring $2^1$.

The said rings $2^1$ and $2^2$ are connected respectively by wires $3^1$ and $3^2$ to terminals of a source of alternating current 4, preferably at relatively high frequency and for example of the order of 1 to 10 millions per second. In this way these members constitute the electrodes of an electric condenser between which the material to be coagulated flows in a continuous manner and at an appropriate speed to undergo there a heating to the heart itself of the mass by dielectric effect.

The assembly formed by the elements 54, $2^1$ and $2^2$ constitutes an actual condenser in which the heating of the mass takes place probably by an effect of viscosity or dielectric hysteresis when a suitable alternating tension is applied to the terminals of the condenser.

Fig. 2 shows a similar arrangement but for which each single electrode $2^1$ and $2^2$ is replaced by at least two electrodes connected between themselves as for a condenser with multiple electrodes, the separations between the electrodes being adapted to be equal or different according to the degree of heating which it is desired to obtain for the materials moving between these electrodes.

The degree of heating can be regulated by a suitable choice of the intensity of the electric field or of the speed of advancement of the thread in such a way as to stop the treatment at any one of the stages which it comprises, that is to say coagulation, drying, vulcanisation.

There can be given to the internal transverse section of the tube or sleeve 53 a form, for example circular, square, rectangular or otherwise, and dimensions corresponding to the section it is desired to give to the coagulated piece. If necessary the tube 53 can be constituted of a material, such as glass or Bakelite, which becomes more or less heated in the electric field of the condenser in such a way as thus to effect a supplementary and exterior heating of the mass to be treated.

After coagulation the piece can be dried, vulcanised, coated with talc, provided with a textile or other covering or undergo any other usual treatment. It can also after coagulation but before vulcanisation undergo modifications in shape such as the impression of striations, channeling, drawings, obtained for example by passage between two engraved wheels, these wheels being able if necessary to play at the same time the part of electrodes.

What we claim is:

1. A process of coagulating coagulatable fluid material into permanent form comprising forming the fluid into a fluid stream of the approximate size of the desired form, and coagulating said stream into permanent form by treating it as the dielectric of a condenser having a frequency of at least approximately one million cycles per second applied thereto.

2. A process of coagulating fluid material such as liquid latex into permanent form comprising forming the fluid into a fluid stream of the approximate size of the desired form, passing said formed stream through means for maintaining said desired form, and simultaneous with said passing, coagulating said stream into permanent form by treating it as the dielectric of a condenser having a frequency of at least approximately one million cycles per second applied thereto.

3. An apparatus for coagulating fluid material into permanent form comprising means for forming said fluid material into a liquid stream having the shape and the approximate size of the form desired, electrode means for making said liquid stream the dielectric of a condenser, and means for applying a frequency of at least approximately one million cycles per second to said electrode means whereby said liquid stream is coagulated into permanent form.

4. An apparatus for the coagulation of a liquid material into permanent thread-like form comprising orifice means for giving said liquid material, as said material flows therethrough in the form of a stream, the cross-sectional shape and the approximate size of the thread form desired, a first electrode having an opening therein conforming to said orifice means positioned adjacent said orifice means, a tube of electrical insulating material having its interior walls conforming to the size and shape of said orifice means and coaxially aligned with said orifice means and said first electrode, a second electrode coaxially aligned with said tube, and means for applying a high frequency alternating current to said first and to said second electrode.

5. An apparatus as in claim 4 further comprising third and fourth electrodes disposed on opposite sides of said second electrode and coaxially aligned therewith.

6. An apparatus for the coagulation of a fluid material into permanent thread-like form comprising means for causing said liquid to fall as a vertical stream having a cross-section of the shape and the approximate form of the thread-like form desired, means for maintaining this desired shape and size of said vertically falling stream, and electrode means having a frequency of at least approximately one million cycles per second applied thereto for making said liquid in maintained form the dielectric of a condenser whereby said liquid is coagulated into permanent thread-like form of the desired shape and size.

7. An apparatus as in claim 6, said electrode means comprising a plurality of electrodes coaxially aligned with said stream.

8. A process of coagulating a dielectric coagulatable fluid material into permanent form comprising forming said fluid material into a fluid stream having the approximate size and shape of the desired permanent form, and subjecting said formed stream to an electrostatic field created by an alternating current having a frequency which causes said fluid material to coagulate into the form given thereto.

RENÉ DUFOUR.
HENRI AUGUSTE LEDUC.